Aug. 15, 1933.    H. C. PRICE ET AL    1,922,324
REMOVABLE CHILL RING FOR PIPE WELDING
Filed May 4, 1932

INVENTORS
Harold C. Price &
BY Donald R. Redding
Fay, Oberlin & Fay
ATTORNEYS.

UNITED STATES PATENT OFFICE 1,922,324

REMOVABLE CHILL RING FOR PIPE WELDING

Harold C. Price and Donald R. Redding, Bartlesville, Okla., assignors to H. C. Price, Inc., Bartlesville, Okla., a Corporation Application May 4, 1932. Serial No. 609,296

2 Claims. (Cl. 113—103)

This invention relates to a backing-up device for use in welding hollow articles such as pipes and the like and has more particular reference to the construction of a removable chill ring for use in welding together adjacent lengths of pipes.

As is well known to those familiar with the art, considerable difficulty has been experienced in the past in positioning and removing the backing-up members or chill rings employed on the inner periphery of pipes when adjacent lengths of pipe are welded together.

It is among the objects of our invention to provide a chill ring construction which may be readily positioned within the pipes and which is especially adapted for ready removal after adjacent lengths have been welded together. Other objects of our invention will appear as the description proceeds.

To the accomplishment of the foregoing and related ends, said invention, then consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
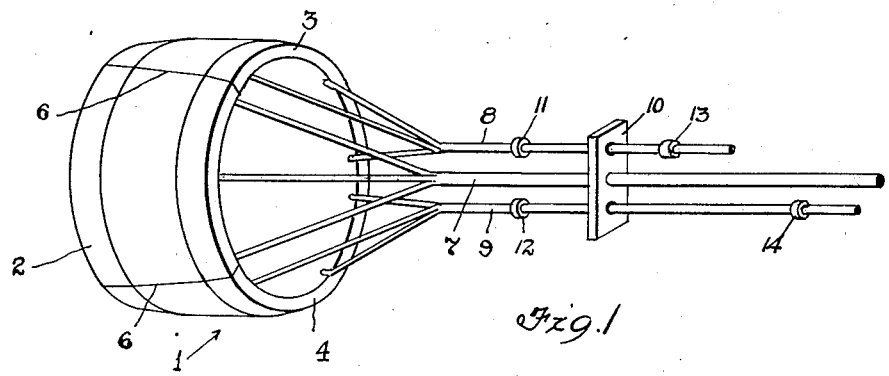
Figure 2:
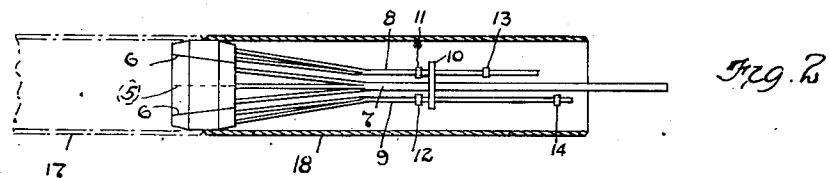
Figure 3:
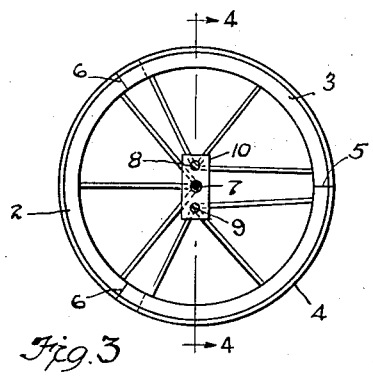
Figure 4:
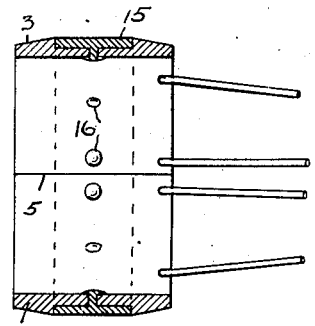

In said annexed drawing:

Fig. 1 is a perspective view of the apparatus comprising our invention; Fig. 2 is a side elevational view of such apparatus illustrated in position at the joint between two pipe lengths; Fig. 3 is an end view of a portion of the apparatus illustrated in the previous figures; and Fig. 4 is a fragmentary transverse sectional view of the apparatus as illustrated in Figure 3 taken on a plane substantially indicated by the line 4—4.

Referring now more specifically to the drawing, the chill ring comprising our invention consists of an annular band, generally indicated at 1, which is split into a plurality of complementary arcuate sections 2, 3 and 4. The ring illustrated in the drawing is shown divided into three parts although it is to be understood that any other convenient number might be employed without departing from the principles of our invention. The line of division 5 between sections 3 and 4 is preferably parallel with the axis of the ring; whereas, the lines 6 separating section 2 from sections 3 and 4 are arranged at an angle to the axis of the ring.

The several sections 2, 3 and 4 of the ring are provided with actuating arms 7, 8 and 9 respectively, which extend axially of the ring and the arm 7 is preferably of a length sufficient to extend beyond the end of the pipe section which is to be welded, in the manner hereinafter more fully explained, to the preceding section of the pipe line.

The arm 7 has a stop block 10 secured thereto and which is provided with apertures so as to slidably engage the arms 8 and 9. The arms 8 and 9 have stop members in the form of collars 11 and 12 secured thereto back of the stop member 10 and such arms also have stop collars 13 and 14 secured thereto forwardly of the stop member 10. The purpose of these stop members and their function will be hereinafter more fully explained in connection with the description of the operation of the device.

The several ring sections 2, 3 and 4 are provided on their outer peripheries with a chill ring generally indicated at 15 which is preferably removably secured to such sections by some suitable means such as rivets 16.

The manner in which the removable chill ring comprising our invention is employed in practice may be briefly described as follows:

Considering that two pipe lengths 17 and 18 are being welded together, the pipe 17 may be the end of a pipe line which is to be extended by the addition of another length 18. The backing-up member 1 with the sections thereof partially separated will be introduced into the end of the pipe member 18 before such pipe 18 is brought into juxtaposition with the pipe 17. The backing-up ring may be wedged into the end of the pipe 18 by driving the wedge-shaped section 2 into proper assembled relation so that the backing-up ring is securely clamped in the end of the pipe 18.

With the backing-up member so clamped and the actuating arms 6, 7 and 8 for the several sections extending axially of the pipe 18, as is most clearly illustrated in Fig. 2, such pipe with the backing-up member projecting from its end will be driven into juxtaposition with the end of the pipe 17 so that the parts will have the relationship illustrated in Fig. 2.

With the parts in this position, the annular seam between the pipe lengths will be fusion welded by any method well known in the art. After the weld has been completed and the two pipes 17 and 18 joined together, the chill or backing-up ring will be removed in the following manner:

A blow on the projecting end of the arm 7 will force the section 2 out of engagement with sections 3 and 4, thereby permitting the backing-up ring to be collapsed. After the section 2 has been so moved out of engagement, it will be moved inwardly by proper manipulation of the rod or arm 7 sufficiently so as to permit an axial withdrawal thereof without a disturbance of the members 3 and 4. The various sections of the backing-up member will thereafter be progressively pulled out of the pipe by simply moving the arm 7 axially.

The first movement of the arm 7 axially, i. e., to the right, as illustrated in Fig. 2, will move the section 2 just past the right-hand end of sections 3 and 4. When section 2 reaches this position, the stop member 10 secured to the rod 7 will engage the stop collar 13 and cause section 3 to follow along with section 2. Section 3 will be moved axially until it is just behind the back end of section 4, whereupon the stop member 10 will engage the collar 14 on rod 9 and cause section 4 to be likewise moved axially of the pipe.

In the above described manner the several sections are successively moved out of the pipe by simply retracting the arm 7 and the single file arrangement of the parts as they are withdrawn from the pipe prevents such parts from becoming jammed during withdrawal.

It is believed that the above description of the apparatus comprising our invention is sufficiently detailed for those familiar with the art. Suffice it to say that certain changes might be made in the proportion of the parts, as explained, without departing from the principles of our invention.

Other modes of applying the principle of our invention may be employed instead of the one explained, change being made as regards the mechanism herein disclosed, provided the means stated by any of the following claims or the equivalent of such stated means be employed.

We, therefore, particularly point out and distinctly claim as our invention:

1. A backing-up device for use in welding tubular articles comprising an annular ring divided into complementary sections with at least one pair of complementary wedging faces, manipulating arms secured to respective sections, a stop member secured to one of said arms and slidably engaging the other arms, and stop members on said last-named arms for engagement with said first-named stop member.

2. A backing-up device for use in welding tubular articles comprising an annular ring divided into complementary sections with at least one pair of complementary wedging faces, manipulating arms secured to respective sections, a stop member secured to one of said arms and slidably engaging the other arms, and stop members on said last-named arms for engagement with said first-named stop member, whereby axial movement of one of said arms will successively withdraw said sections from their assembled position.

HAROLD C. PRICE.
DONALD R. REDDING.